United States Patent
Zander et al.

(10) Patent No.: US 11,394,452 B2
(45) Date of Patent: Jul. 19, 2022

(54) MULTIPLE BEAM RECEPTION IN COMMUNICATION DEVICE

(71) Applicant: Sony Corporation, Tokyo (JP)

(72) Inventors: Olof Zander, Södra Sandby (SE); Erik Bengtsson, Eslöv (SE); Fredrik Rusek, Eslöv (SE)

(73) Assignee: Sony Group Corporation, Tokyo (JP)

(*) Notice: Subject to any disclaimer, the term of this patent is extended or adjusted under 35 U.S.C. 154(b) by 17 days.

(21) Appl. No.: 17/261,283

(22) PCT Filed: Jul. 31, 2019

(86) PCT No.: PCT/SE2019/050720
§ 371 (c)(1),
(2) Date: Jan. 19, 2021

(87) PCT Pub. No.: WO2020/032862
PCT Pub. Date: Feb. 13, 2020

(65) Prior Publication Data
US 2021/0281314 A1    Sep. 9, 2021

(30) Foreign Application Priority Data
Aug. 10, 2018   (SE) .................................. 1850969-5

(51) Int. Cl.
*H04B 7/0417* (2017.01)
*H04B 7/10* (2017.01)
*H04B 7/06* (2006.01)

(52) U.S. Cl.
CPC ............. *H04B 7/10* (2013.01); *H04B 7/0417* (2013.01); *H04B 7/0632* (2013.01); *H04B 7/0695* (2013.01)

(58) Field of Classification Search
CPC ...... H04B 7/0636; H04B 7/10; H04B 7/0417; H04B 7/0632; H04B 7/0695; H04B 7/063;
(Continued)

(56) References Cited

U.S. PATENT DOCUMENTS

| | | |
|---|---|---|
| 2008/0232502 A1 | 9/2008 | Wild et al. |
| 2013/0044028 A1 | 2/2013 | Lea et al. |

(Continued)

FOREIGN PATENT DOCUMENTS

WO    2018/020078 A1    2/2018

OTHER PUBLICATIONS

International Search Report and Written Opinion for corresponding International Patent Application No. PCT/SE2019/050720 dated Sep. 24, 2019.
(Continued)

*Primary Examiner* — Andrew Wendell
(74) *Attorney, Agent, or Firm* — Renner, Otto, Boisselle & Sklar, LLP

(57) ABSTRACT

A method for operating a communication device configured to receive radio signals in multiple device beams, the method comprising: —receiving (512) at least one identifiable radio signal (321,322) from a wireless network; —determining (514) a link quality metric for one or more device beams (34,35,36) based on the at least one received radio signals; —transmitting (516) device beam indication data (522), including link quality metric for at least one of said one or more device beams (34), to an access node (20) of the wireless network, which device beam indication data is formatted to identify at least one pair (34,35) of said multiple device beams configured with common settings but different polarizations.

17 Claims, 3 Drawing Sheets

(58) Field of Classification Search
CPC .... H04B 7/0639; H04B 7/0658; H04B 7/088; H04B 7/0404; H04B 7/0408; H04W 16/28
See application file for complete search history.

(56) References Cited

U.S. PATENT DOCUMENTS

| | | |
|---|---|---|
| 2015/0333885 A1 | 11/2015 | Athley et al. |
| 2016/0020837 A1 | 1/2016 | Schober et al. |
| 2016/0036506 A1 | 2/2016 | Kanai |
| 2016/0157218 A1* | 6/2016 | Nam .................... H04B 7/0639 370/329 |
| 2016/0337056 A1 | 11/2016 | Frenne et al. |
| 2018/0091272 A1* | 3/2018 | Wang ................... H04B 7/0626 |
| 2018/0205438 A1* | 7/2018 | Davydov ............. H04B 7/0639 |
| 2018/0213527 A1* | 7/2018 | Liu ....................... H04W 24/10 |
| 2018/0227102 A1 | 8/2018 | Wilson et al. |
| 2018/0248601 A1* | 8/2018 | Kishiyama ........... H04B 7/0632 |
| 2018/0278316 A1* | 9/2018 | Yang .................... H04B 7/0617 |
| 2018/0279293 A1* | 9/2018 | Harrison .............. H04B 7/0695 |
| 2019/0097693 A1* | 3/2019 | Park ..................... H04L 5/0023 |
| 2019/0159054 A1* | 5/2019 | Yiu ....................... H04W 36/08 |
| 2020/0136682 A1* | 4/2020 | Faxér ................... H04B 7/0478 |

OTHER PUBLICATIONS

Swedish Search Report for corresponding Swedish Patent Application No. 1850969-5 dated Apr. 4, 2019.

* cited by examiner

Device beam

| Power | 1 | 2 | 3 | 4 | 5 | 6 |
|---|---|---|---|---|---|---|
| 1 | 5 | 0 | 3 | 2 | 0 | 0 |
| 2 | *8* | 2 | 7 | 0 | 0 | 0 |
| 3 | 0 | 0 | 0 | 3 | 0 | 0 |
| 4 | 1 | 7 | 6 | 2 | 0 | 0 |
| 5 | 7 | 3 | 5 | 0 | 1 | 0 |

Access node beam

Fig. 3

Device beam

| Power | 1 | 2 | 3 | 4 | 5 | 6 |
|---|---|---|---|---|---|---|
| 1 | 5 | 0 | 3 | 2 | 0 | 0 |
| 2 | *8* | 2 | 7 | 0 | 0 | 0 |
| 3 | 0 | 0 | 0 | 3 | 0 | 0 |
| 4 | 1 | 7 | 6 | 2 | 0 | 0 |
| 5 | 7 | 3 | 5 | 0 | 1 | 0 |

Access node beam 41  42  43

Fig. 4

MULTIPLE BEAM RECEPTION IN COMMUNICATION DEVICE

This application is a national phase of International Application No. PCT/SE2019/050720 filed Jul. 31, 2019.

TECHNICAL FIELD

The present invention relates to methods for operating communication devices and access nodes in a wireless communication system, in particular to methods for multiple input and multiple output (MIMO) technologies, where the communication devices are devised with antennae to at least receive radio signals in multiple beams. The present invention relates furthermore to communication devices, access nodes and a communication system supporting the methods.

BACKGROUND

Increasing use of mobile voice and data communications may require a more efficient utilization of the available radio frequency resources. For increasing data transmission performance and reliability, the so-called multiple input and multiple output (MIMO) technology may be used in wireless radio telecommunication systems for transmitting information between the devices, for example between a base station and a user equipment. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

The so-called full dimensional MIMO (FDMIMO) refers to a technology that arranges the signals transmitted to antennas in the form of beams that are able to power multiple receivers in three dimensions. For example, a base station may comprise a large number of active antenna elements in a two-dimensional grid and the use of the FDMIMO technology enables a support of many spatially separated users on the same time/frequency resource blocks simultaneously. This may reduce interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic may need information about radio channel properties between the user equipment and the antennas of the base station. Vice versa, in order to adapt the transmit signal at each individual antenna of the user equipment, a user equipment logic may need information about the radio channel properties between the base station and the antennas of the user equipment. For this purpose, a so-called channel sounding may be performed to determine the radio channel properties between the user equipment and the base station. The channel sounding may comprise transmitting predefined pilot signals which may allow the base station and the user equipment to set their configuration antenna parameters for transmitting signals so as to focus radio energy or for receiving radio signals from a certain direction.

When the operational frequency increases and consequently the wavelength decreases, the antenna aperture becomes small and therefore multiple antennas may be utilized to increase the received power. In particular in case of high transmission frequencies of for example 30 GHz or more and multiple antennas having small apertures, the reception sensitivity may significantly depend on polarization of the transmitted radio-frequency signals. However, in particular when the user equipment is a movable device, the polarization of the antennas of the user equipment may vary with respect to the antenna arrangement of the base station.

In evolving standards, for example in 3GPP RAN1 Release 15, is defined that the base station broadcasts beam shaped synchronization signals (so-called SS-bursts). Different SS-bursts targeting different directions or polarizations are distributed both in time and frequency domain such that each beam is occurring at each sub-band over time. The user equipment may listen for the SS-bursts and may use the received signal to calibrate frequency and timing. The user equipment may scan or adjust its receive beam in order to find the direction that is associated with the strongest SS-burst. However, the polarization of the SS-burst signal may not be optimal for the user equipment depending on the current arrangement of the antennas of the user equipment. For improving the receive beam adjustment of the user equipment, the base station may repeat each SS-burst signal with an orthogonal polarization. However, as the user equipment may receive also SS-burst signals transmitted in other sectors, for example neighboring sectors or due to reflections, it may be difficult for the user equipment to find the strongest beam and optimize the receive beam polarization.

In view of the above, there is a need in the art for methods and devices which address at least some of the above shortcomings of conventional MIMO systems. In particular, there is a need in the art for improving operation of devices in a wireless communication system to reduce the power losses of wireless communications due to polarization misalignments.

SUMMARY

According to the present invention, this object is achieved by the features of the independent claims. The dependent claims define embodiments of the invention.

According to a first aspect, a method is provided for operating a communication device configured to receive radio signals in multiple device beams, the method comprising:
  receiving at least one identifiable radio signal from a wireless network;
  determining a link quality metric for one or more device beams based on the at least one received radio signals;
  transmitting device beam indication data, including link quality metric for at least one of said one or more device beams, to an access node of the wireless network, which device beam indication data is formatted to identify at least one pair of said multiple device beams configured with common settings but different polarizations.

By means of this method, the access node is provided with extended information on suitability with regard to beam-pair selection in communication with the communication device.

In one embodiment, said device beam indication data is formatted according to a predetermined rule to identify said pair of device beams. This obviate the need for additional overhead data to be conveyed.

In one embodiment, an identity of a first device beam having a first polarization of said pair is uniquely linked to a second beam of said pair by means of an index or order provided in the device beam indication data. This provides a fast and reliable way for the access node to obtain information on properties of device beams, for selection of beam-pairs.

In one embodiment, the method comprises determining a subset of said one or more beams, based on a number of uplink beams supported or desired by the communication device for data transmission, wherein said beam indication data identifies said link quality metric for said subset of beams. Since the communication has obtained knowledge of receive beams that are suitable for reception of two streams with a common phase, a selected subset which is suitable for the communication device may be reported in a beam-pair report, including or associated with the device beam indication data.

In one embodiment, determining a link quality is carried out for a currently used device beam, having a first polarization, and wherein said beam indication data is formatted to identify a currently unused device beam, where said used beam and said unused beam forms said at least one pair of device beams. This way, a connected access node may be informed of a suitable additional beam to use, which can be received with a common phase in the communication device.

In one embodiment, the method comprises transmitting a capability indication to a wireless network, indicating polarization distinction capability. This way, any access node of the network may be informed of such capability, which may obviate further signaling from the communication device of such capability.

In one embodiment, said beam indication data identifies an identity associated with the radio signal received in said at least one device beam. This way, suitable beam pairs for selection by the access node are identified.

In one embodiment, said identity is associated with an access node beam. This may e.g. include a beam index of one or more access node beams.

According to a second aspect, a communication device is provided, comprising:
  an antenna arrangement configured to receive radio signals in multiple device beams, and
  a logic coupled to the antenna arrangement and configured to
  receive at least one identifiable radio signal from a wireless network;
  determine a link quality metric for one or more device beams based on the at least one received radio signals;
  transmit beam indication data, including link quality metric for at least one of said one or more device beams, to an access node of the wireless network, which beam indication data is formatted to identify at least one pair of said multiple device beams configured with common settings but different polarizations.

According to a third aspect, a method is provided for operating an access node of a wireless network, comprising an antenna arrangement for wireless communication in a plurality of access node beams, comprising
  receiving device beam indication data from a communication device configured to receive radio signals in multiple device beams, which device beam indication data includes link quality metric for at least one of said device beams and is formatted to identify at least one pair of said device beams configured with common settings but different polarizations;
  configuring the antenna arrangement for communication in one or more of said access node beams based on the device beam indication data.

This way, an increased set of information is obtained by the access node, on which to base beam-pair selection for communication with the communication with the communication device.

Although specific features are described in the above summary and in the following detailed description described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

FIG. 3 schematically illustrates a visualization of link quality metric for a number of beam pairs as obtained by a communication device.

FIG. 4 illustrates an embodiment of device beam indication data formatted to identify at least one pair of device beams configured to a common phase but different polarizations.

DETAILED DESCRIPTION

Figure 1:
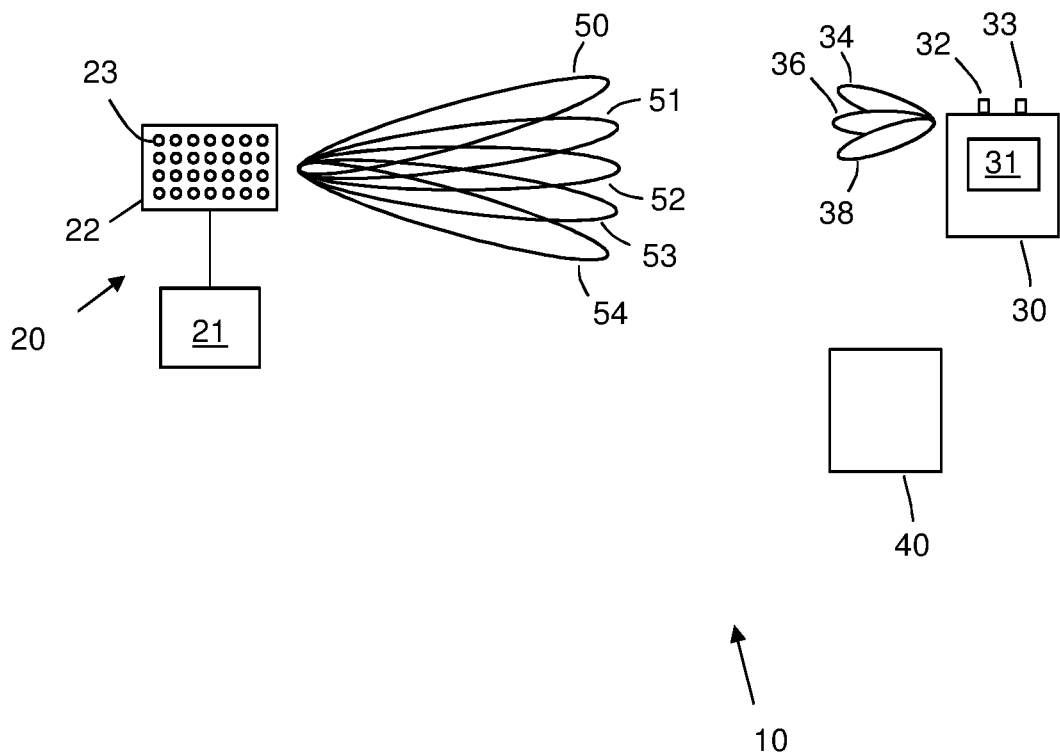
FIG. 1 schematically illustrates a wireless communication system according to an embodiment.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Embodiments are described in the context of radio communication in a wireless communication system, typically operating by means of radio communication or other electromagnetic communication. As such, the wireless communication system includes at least one wireless communication device, configured to communicate with a network via an access node. The network may include a core network and a plurality of access nodes connected to the core network. In various embodiments the wireless system may include a cellular wireless network, where a plurality of access nodes may cover a contiguous area and be configured to hand over communication or connection from one access node to another, as a wireless communication device moves from one cell to another. In such systems, access nodes are commonly referred to as base stations. In 3GPP systems for LTE the term eNB is used, and for 5G New Radio (NR) the term gNB has been employed. Alternatively, the access nodes may form discontinuous or uncorrelated coverage, and e.g. act as Wi-Fi access points or hotspots under one or more 3GPP 802.11 specification.

Herein, the term access node will generally be used to designate an entity of a wireless network, used for establishing and controlling an air interface for communication with wireless communication devices. Furthermore, communication device will be the term used for a wireless device configured to communication with an access node, and possibly directly with or via other communication devices. In specifications under 3GPP, such communication devices are generally referred to as user equipment, UE.

FIG. 1 shows a wireless communication system 10 according to an embodiment. The wireless communication system 10 includes an access node 20 and a plurality of communication devices. In FIG. 1, two communication devices 30 and 40 are shown. The access node 20 may support a so called multiple input and multiple output (MIMO) technology and therefore the access node 20 may have a large number of antennas, for example several tens or in excess of one hundred antennas.

The access node 20 comprises an antenna arrangement 22 comprising a plurality of antennas which are indicated by circles in FIG. 1. One exemplary antenna of the plurality of antennas is referenced by reference sign 23. The antennas 23 may be arranged in a two-dimensional or three-dimensional antenna array on a carrier. The access node 20 may comprise furthermore associated (not shown) transceivers for the antennas 23. The access node 20 comprises furthermore an access node logic 21. The access node logic 21 is coupled to the antenna arrangement 22 and comprises for example a controller, a computer or a microprocessor. Although in FIG. 1 only one antenna arrangement 22 is shown, the access node 20 may comprise more than one antenna arrangement, for example two, three, four or even more, for example several tens of antenna arrangements, which may cooperate with each other and which may be arranged near to each other or spaced apart.

The antenna arrangement 22 may be configured to transmit radio-frequency signals, or radio signals for short, into specific directions, herein referred to as beams. Five of these beams are shown in FIG. 1 and indicated by reference signs 50-54. The configuration of the beams may be static or dynamic. The transmission of radio frequency signals into a specific direction may be achieved by beamforming technologies as it is known in MIMO technologies. In connected mode, a communication device may be able to communicate with the access node 20 through one beam, or possibly more than one beam. However, the access node 20 may continuously announce its beams by beam sweeping, wherein the beams are individually announced in different resources, such as one at a time, where after communication devices are provided with the opportunity to report back to the access node 20, indicating one or more detected beams. This may be referred to as beam sweeping.

The antenna arrangement 22 may be equipped with dual polarized antennas and may therefore have the capability to transmit and/or receive signals with any polarization, for example a first polarization and second polarization, wherein the first and second polarizations are orthogonal to each other. Furthermore, in particular spatially distributed antenna arrangements may be capable of transmitting radio-frequency signals having also a third polarization which is orthogonal to the first polarization and orthogonal to the second polarization.

In the communication system 10, as shown in FIG. 1, a plurality of communication devices like mobile phones, mobile and stationary computers, tablet computers, smart wearable devices or smart mobile devices may be arranged. Two exemplary communication devices 30 and 40 are shown in FIG. 1. Each of the communication devices 30 and 40 may be configured to communicate with the access node 20.

In the following, the communication device 30 will be described in more detail. However, the communication device 40 may comprise similar features as the communication device 30 and may therefore act similarly. The communication device 30 comprises one or more antennas. In the exemplary embodiment shown in FIG. 1, the communication device 30 comprises two antennas 32 and 33. For example, the antennas 32, 33 may each comprise an antenna panel or an antenna array, or the antennas 32, 33 may be formed by an antenna array comprising a plurality of antennas. Furthermore, the communication device 30 comprises a logic 31. The logic 31 may comprise for example a controller or microprocessor. The logic 31 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 31 over a data bus. The data storage device is considered a non-transitory computer readable medium. One or more processors of the logic 31 may execute instructions stored in the data storage device or a separate memory in order to carry out operation of the communication device 30, as outlined herein. The communication device 30 may comprise more components, for example a graphical user interphase and a battery, but these components are not shown in FIG. 1 for clarity reasons.

The antennas 32, 33 of the communication device 30 may be arranged spaced apart from each other, for example, the two antennas 32 and 33 may be arranged at a top side of the communication device near the edges. As an alternative, one or more antennas may be arranged at the top side and some other antennas may be arranged at a bottom side of the communication device 30. The two, or more, antennas 32, 33 form an antenna arrangement, whereby the communication device 30 is configured to receive radio signals in multiple device beams 34, 36, 38 as will be further discussed with reference to FIG. 2. The communication device 30 may be configured to operate multiple receive beams and multiple transmit beams, simply referred to herein as device beams 34, 36, 38. For example, one device beam 34 may be configured for reception and/or transmission of radio signals with a first phase shift and a second device beam 36 may be configured for reception and/or transmission of radio signals with a second phase shift. In various embodiments, this may mean that a first beam 34 is configured to receive and/or transmit radio signals in first direction, whereas a second beam is configured to receive and/or transmit radio signals in a second direction. Such directions may be set by the antenna structure, or by phase adaptation by means of one or more phase shifters connected to the antenna arrangement 32, 33. Since a communication device 30 may be mobile, and thus rotatable with regard to the access node 20, device beam adaptation and/or selection may be repeatedly required.

Figure 2:
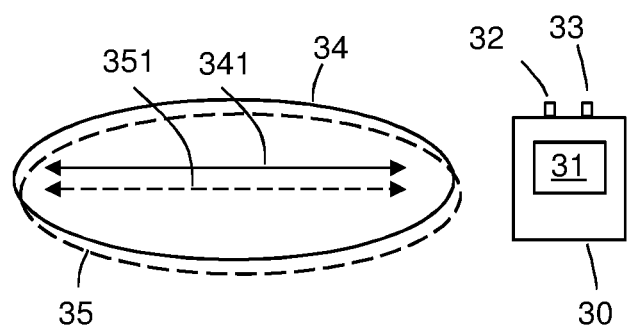
FIG. 2 schematically illustrates reception of signals in two different device beams of a communication device configured to receive data in multiple beams.

FIG. 2 illustrates the communication device 30 of FIG. 1. In addition to what was laid out with reference to FIG. 1, the communication device 30 may be configured to distinguish polarization in the device beams. This may e.g. be arranged by means of polarization ports connected between the phase shifters and the antennas 32, 33. The communication device 30 may be configured such that one device beam 34 may be configured to receive and/or transmit radio signals 341 in a first polarization, whereas another beam 35 may be may be configured to receive and/or transmit radio signals 351 in a second polarization, which is different from the first polarization. More specifically, the first and second polarizations may be orthogonal.

In NR the concept of beams is central. Traditionally, a beam is an abstract object which is merely thought of as a possible link between access node 20, e.g. eNB, and communication device 30 BS, e.g. UE. As such, it is only characterized with a number or identity. Providing the BS with slightly more information than just "possible path number X has a quality that is Y" opens up the possibility for the access node to make better decisions regarding communication device scheduling and transmission modes. The analogy to a road network is strong. If we simply know that there are three roads between point A and point B, namely roads 1, 2 and 3, we have more difficulties of directing traffic than if we knew that road 1 and 2 are built only 50 m apart from each other, while road 3 links the cities in a totally different way. The present invention is based on the idea of providing the access node 20 with information about polarization properties of reported beams. In various embodiments, this involves reporting which of the reported beams are configured with common settings but different polarization. This may refer to a pair of beams which have different polarization, e.g. orthogonal polarization, but which are otherwise identically configured. In various embodiments, such a pair of beams may have the same physical directional properties, or spatial properties, such as angle of arrival or departure, but different polarization. The inventors have realized that this will turn out to be important once progressing from SISO transmission to (uplink)-MIMO in NR.

FIG. 3 illustrates a table, which schematically shows information that may be collected by a communication device 30 upon detecting radio signals in the downlink, in an exemplary embodiment of a wireless communication system that operates MIMO in both uplink and downlink. The two, or more, antennas 32, 33 form an antenna arrangement, whereby the logic 31 of the communication device 30 is coupled to the antenna arrangement and configured to receive one or more identifiable radio signals, such as 341, 351 of FIG. 2, from the wireless network in the different device beams. Once an access node 20 concludes a beam sweep, the communication device 30 has collected signal strengths across all or at least a plurality of detected access node tx beams, and all its own rx device beams. The acquired information may be visualized as in the table of FIG. 3, where a plurality of access node beams 1-5 are listed in various rows and a plurality of device beams are listed in various columns 1-6.

In such a scenario, connection and communication between the access node 20 and the communication device 30 may be executed in so-called beam pairs. With reference to FIG. 1, such a beam pair could e.g. be beams 50, 34. The logic 31 of the communication device 30 is configured to determine a link quality metric for one or more device beams based on the received radio signals. With reference to the table of FIG. 3, the link quality metric "8" is marked for a combination of access node beam 2 and device beam 1, which means that if the access node 20 were to choose beam 2 and the UE beam 1, then communication link would have a link quality of 8, in some measurement system.

In a scenario where MIMO transmission is used or declared by the wireless network, the communication device 30 may be configured to report a few (configurable in specification) preferred beams pairs. A problem targeted herein is that as seen from the access node 20, the reported beam indices are just numbers, with no proper physical meaning with regard to the device beams. More specifically, the access node 20 cannot know which device beams are configured for signal reception in which directions and can therefore not use this information.

For these reasons, it is suggested that the communication device is configured to transmit device beam indication data, including link quality metric for at least one of said one or more device beams to the access node 20, which device beam indication data is formatted to identify at least one pair of said multiple device beams configured with common settings, but different polarizations. As noted, this may refer to a pair of beams which have different polarization, e.g. orthogonal polarization, but which are otherwise identically configured. In various embodiments, the pair of beams may have the same physical directional properties, or spatial properties, but different polarization. Such pair of beams may e.g. be configured with a setting of a common phase shift, phase setting or phase adaptation by means of one or more phase shifters connected to the antenna arrangement 32, 33. In various embodiments, the pair of beams may be configured with common settings to define a common beam angle, such as an angle of arrival or angle of departure. In this context, it should be understood that a beam pair is used in its generally known meaning within the field of beamforming within radio communication, i.e. one downlink (DL) beam and one uplink (UL) beam. The pair of device beams refers to two beams of a communication device 30, in which radio signals have been detected from an access node, which pair of beams have different polarization but are correlated by means of common settings, such as a common phase shift, or phase setting, or correlated or common direction of arrival or departure.

Detection and distinction of radio signals of different polarization in beams having a common settings may e.g. be realized by means of one or more patch antennas in the antenna arrangement of the communication device 30. Although it would seem, from the table of FIG. 3, as if the communication device 30 has 6 beams, they may thus be configured to appear in pairs. There are 3 different angles of arrival AoA, (and/or angles of departure AoD) represented by the shown device beams 34, 36, 38 in FIG. 1, and for each angle or direction there are two polarizations. In each direction, two beams may thus be reported, e.g. 34 and 35 of FIG. 2. Today, the access node 20 cannot take this for granted, as the antenna configuration of the communication device 30 may be up to implementation. However, by formatting the device beam indication data to identify at least one pair of said multiple device beams configured with a common settings but different polarizations, an uplink beam pair report will implicitly convey information about beam configuration in the communication device 30 to the access node 20. Moreover, this is obtained without any overhead of data provided over the air interface.

Preferably, the device beam indication data is formatted according to a predetermined rule to identify one or more pairs 34,36 of device beams. This may in various embodiments be accomplished by providing that an identity of a first device beam 34 having a first polarization of said pair, is uniquely linked to a second beam 36 of said pair by means of an index or order provided in the device beam indication data.

In various embodiments, the predetermined rule is shared by the communication device 30 and the wireless network, specifically the access node 20, and therefore no overhead data is required to convey data prescribing the pairing or the rule. In one embodiment, the predetermined rule is defined by specification. The rule may be mandatory under a specification, or mandatory if and where a communication device provides information to the wireless network that it supports communication in two polarizations for at least one common beam configuration setting, such as one direction. In various embodiments, the communication device 30 may thus be configured to transmit a capability indication to the wireless network, indicating polarization distinction capability. This may be performed upon access to a wireless network and may therefore typically be avoided for subsequent cell reselections within that network.

FIG. 4 schematically illustrates the same table as in FIG. 3, but here the beams of common settings, such as the same direction, are marked as grouped in pairs 41, 42, 43. For each of these pairs, e.g. pair 41, there is a first beam 34 configured for receiving a radio signal 341 of a first polarization, and a second beam 35 configured for receiving a radio signal 351 of a second polarization. The first and second polarizations are different, and preferably orthogonal.

The table of FIG. 4 illustrates a formatting where the communication device beams are formatted for use in an uplink beam report to be arranged in pairs, with successive reported device beams, or successive device beam indices, relating to beams with common settings, such as a common or correlated direction. The device beam indication data may in such an embodiment be formatted according to a predetermined rule to identify each pair of device beams, e.g. as (odd index, next even index), which leads to the access node being able to determine device beam pairs as (1,2); (2,4); (5,6).

Other alternatives are plausible within the scope of this step of formatting the device beam indication data to identify one or more pairs of multiple device beams configured with a common setting but different polarizations. One such variant may include providing a report for a number of communication device beams, where the first half of beams have a first polarization, and a last half of beams have a different, preferably orthogonal, polarization. As an example, pairing could be assessed by the access node 20 from a predetermined formula (i,i+k/2), for device beam indices i=1 to k. This would, in the example of FIG. 3 with beam indication data identifying 6 device beams, means that the device beam pairs may be determined by the access node 20 from an uplink report from the communication device 30 to be (1,4); (2,5); (3,6).

In various embodiments, the communication device may be configured to determine which beams to report, from the beams 50-55 provided or detected from the access node 20. This may include determining which DL beams, i.e. access node beams 50-55, and which UL beams, i.e. device beams 34-39, are suitable for use in data communication. The decision on which beam pairs to use will be taken by the access node 20, but the communication device 30 will, by means of the beam indication data, provide information on suitable beam pairs. The communication device 30 may thus be configured to determine which subset of beam pairs to report by means of the beam indication data, based on a number of uplink beams supported or desired by the communication device for data transmission, wherein said beam indication data identifies said link quality metric for said subset of beams.

In various embodiments, a further technical effect is obtained in that the communication device 30 may report beam indication data to implicitly inform the access node 20 of device beams 34, 35 having different polarization but otherwise common settings, such as correlated direction. In such an embodiment, the communication device 30 may be configured to determine link quality for a currently used device beam 34, having a first polarization, and wherein said beam indication data is formatted to identify a currently unused device beam 36, where said used beam and said unused beam forms said at least one pair of device beams. This embodiment thus provides yet another variant of a predetermined rule for providing information of e.g. direction correlated device beams with different polarization, where one or more currently used beams are sounded (SRS) also in the orthogonal polarization. The fact that there are SRS present in pre-defined resources for such orthogonal but correlated beams notifies the access node 20.

Figure 5:
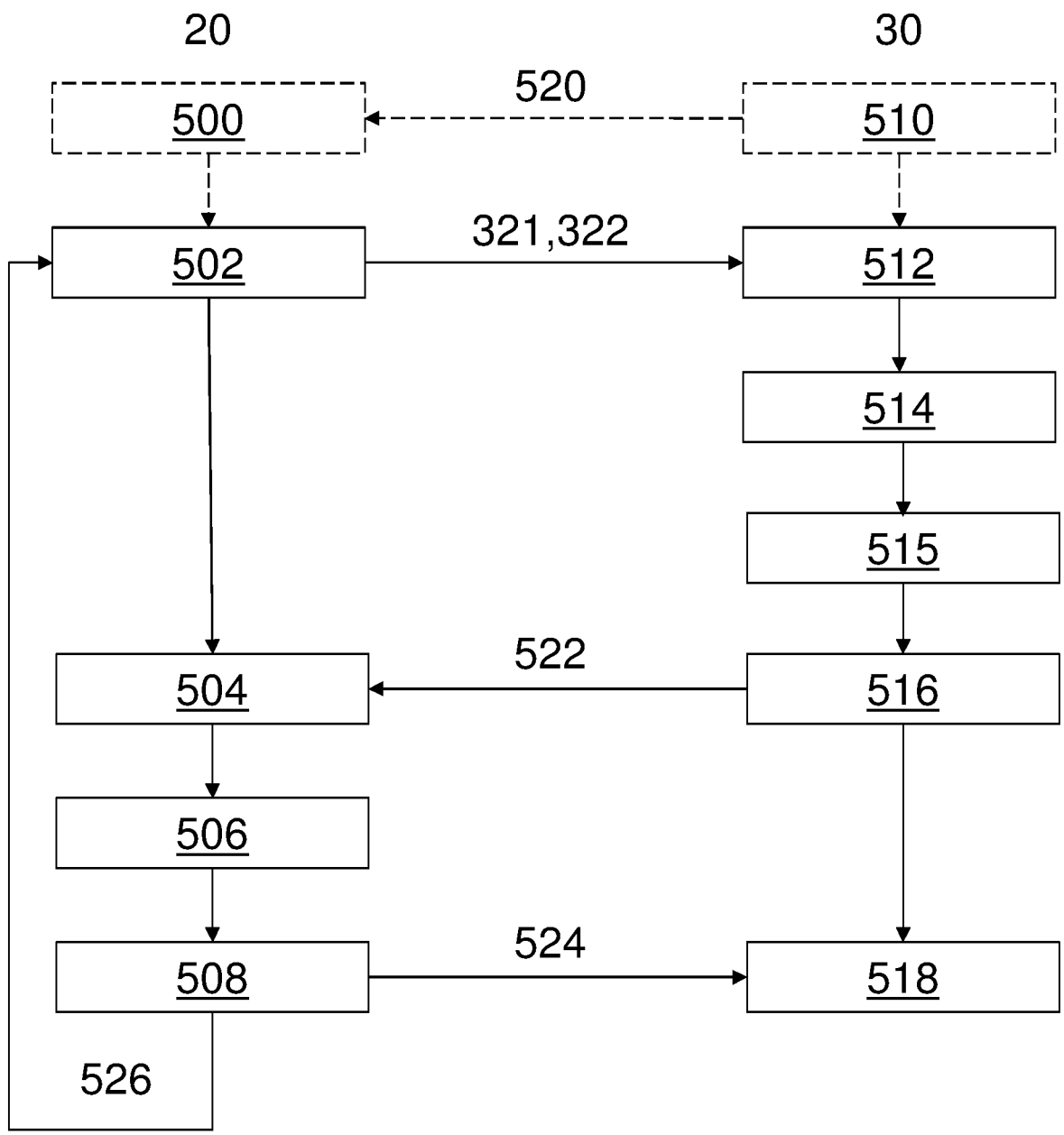
FIG. 5 shows a flowchart comprising method steps according to various embodiments.

FIG. 5 illustrates steps and signals transmitted and received in an embodiment of the invention. To the left, steps carried out by a wireless communication network are shown, predominantly by an access node 20. To the right, steps carried out by a communication device 30 are shown. The steps shown and described are consistent with the description provided throughout this specification, with reference to FIGS. 1-4.

In various embodiments, the communication device 30 may transmit 510 a capability indication 520 to a wireless network, indicating polarization distinction capability. The capability indication 520 may be received 500 in any access node of the wireless communication system. Where polarization distinction capability is prescribed, e.g. by specification, or otherwise detectable by the wireless network through other data or signals, these steps may be left out. Hence, these steps are indicated by dashed lines in the drawing.

In step 502, access node 20 transmits at least one identifiable radio signal 321,322, and normally a plurality of identifiable radio signals. The transmitted signal(s) may e.g. be shaped synchronization signals (so-called SS-bursts), transmitted in a beam sweep from the access node. In step 512, at least one identifiable radio signal 321,322 is received in the communication device 30. At least one of said radio signals 321,322 may originate from the access node 20.

In step 514, the communication device 30 determines a link quality metric for one or more device beams 34,35, based on the at least one or more received radio signals. This step may include determining a link quality metric reflecting or based on detected signal strength of the received one or more radio signal 321,322.

In step 515, which is optional, the communication device 30 may determine a subset of said one or more beams, based on a number of uplink beams supported or desired by the communication device for data transmission. The beam indication data will then identify the link quality metric for said subset of beams.

In step 516, the communication device transmits device beam indication data 522, including link quality metric for at least one of said one or more device beams, to the access node 20 of the wireless network. The device beam indication data 522 is received in the access node 20 in step 504. The device beam indication data may form part of a beam pair report, indicating link quality of a number of beam pairs, each provided for one DL tx beam of the access node 20, and one rx device beam of the communication device 30. The device beam identification data may thus identify an identity associated with the radio signal 321, 322 received 512. Identification of the tx beam of the access node 20 may be taken from beam index data, obtained in or in association with the received at least one radio signal 321, 322. The device beam identification data 522 is formatted to identify at least one pair 34,35 of said multiple device beams configured with common settings, such as a common phase or direction, but different polarizations. In various embodiments, the device beam identification data 522 may be formatted in accordance with a predetermined rule, e.g. as specified and known to both the communication device 30 and the access node 20, to identify the at least one pair 34,35, e.g. in accordance with any of the examples provided herein.

In step 506, the access node 20 may be arranged to configure an antenna arrangement 22 for beamforming. In various embodiments, this involves configuring the antenna arrangement for communication in one or more access node beams based on the device beam indication data 522. This may involve selecting one of the beam pairs reported in association with the device beam indication data 522.

One of the implications of this procedure is that it allows the access node 20 to decide whether Beam MIMO or Polarization MIMO should be used. Beam MIMO involves communication in two different AoA and requires more beam management. Polarization MIMO involves only one AoA, but two polarizations, and requires less beam management. Specifically, the access node 20 may take the communication device's 30 reported device beam indication data 522 into account, which provides information on its possibility to receive two streams with different polarization in beams with common settings, such as a common directionality. The access node 20 may further take traffic information of other communication devices into consideration, and take a decision in step 506 on which beams or beam pairs to employ. Since the access node 20 knows its own polarization properties, it thus has full control over the situation and may predict the link quality if the communication device 30 applies polarization beamforming within a given direction. Overall, an improved basis for taking beam selection decisions in step 506 is obtained.

In step 508, the access node 20 may transmit determined beam pair data 524 to the communication device 30, which receives it at step 518. Signals or payload data may subsequently be communicated in DL and/or UL between the access node 20 and the communication device 30 (not shown). carried out at the communication device, data 524 may be shared in connected mode.

In step 526 the access node 20 may again transmit radio signals 321, 322, preferably by broadcast, for reception by communication devices, and repetition of the procedure as described. Step 526 may provide a step from a first to a second beam sweep in various embodiments.

The invention claimed is:

1. A method for operating a communication device configured to receive radio signals in multiple device beams, the method comprising:
   receiving at least one identifiable radio signal from a wireless network;
   determining a link quality metric for one or more device beams based on the at least one received radio signals;
   transmitting device beam indication data, including link quality metric for at least one of said one or more device beams, to an access node of the wireless network, which device beam indication data is formatted to identify at least one pair of said multiple device beams configured with common settings but different polarizations.

2. The method of claim 1, wherein said device beam indication data is formatted according to a predetermined rule to identify said pair of device beams.

3. The method of claim 2, wherein an identity of a first device beam having a first polarization of said pair is uniquely linked to a second beam of said pair by means of an index or order provided in the device beam indication data.

4. The method of claim 1, comprising:
   determining a subset of said one or more beams, based on a number of uplink beams supported or desired by the communication device for data transmission, wherein said beam indication data identifies said link quality metric for said subset of beams.

5. The method of claim 1, wherein determining a link quality is carried out for a currently used device beam, having a first polarization, and wherein said beam indication data is formatted to identify a currently unused device beam, where said used beam and said unused beam forms said at least one pair of device beams.

6. The method of claim 1, comprising:
   transmitting a capability indication to a wireless network, indicating polarization distinction capability.

7. The method of claim 1, wherein said beam indication data identifies an identity associated with the radio signal received in said at least one device beam.

8. The method of claim 7, wherein said identity is associated with an access node beam.

9. A communication device comprising:
an antenna arrangement configured to receive radio signals in multiple device beams, and
a logic coupled to the antenna arrangement and configured to
receive at least one identifiable radio signal from a wireless network;
determine a link quality metric for one or more device beams based on the at least one received radio signals;
transmit beam indication data, including link quality metric for at least one of said one or more device beams, to an access node of the wireless network, which beam indication data is formatted to identify at least one pair of said multiple device beams configured with common settings but different polarizations.

10. The communication device of claim 9, wherein the logic is configured to format said device beam indication data according to a predetermined rule to identify said pair of device beams.

11. The communication device of claim 10, wherein an identity of a first device beam having a first polarization of said pair is uniquely linked to a second beam of said pair by means of an index or order provided in the device beam indication data.

12. The communication device of claim 9, wherein the logic is configured to
determine a subset of said one or more beams, based on a number of uplink beams supported or desired by the communication device for data transmission, wherein said beam indication data identifies said link quality metric for said subset of beams.

13. The communication device of claim 1, wherein the logic is configured to determine a link quality for a currently used device beam, having a first polarization, and to format said beam indication data to identify a currently unused device beam, where said used beam and said unused beam forms said at least one pair of device beams.

14. The communication device of claim 9, wherein the logic is configured to
transmit a capability indication to a wireless network, indicating polarization distinction capability.

15. The communication device of claim 9, wherein said beam indication data identifies an identity associated with the radio signal received in said at least one device beam.

16. The communication device of claim 15, wherein said identity is associated with an access node beam.

17. A method for operating an access node of a wireless network, comprising an antenna arrangement for wireless communication in a plurality of access node beams, comprising
receiving device beam indication data from a communication device configured to receive radio signals in multiple device beams, which device beam indication data includes link quality metric for at least one of said device beams and is formatted to identify at least one pair of said device beams configured with common settings but different polarizations;
configuring the antenna arrangement for communication in one or more of said access node beams based on the device beam indication data.

* * * * *